United States Patent [19]

Muller

[11] Patent Number: 4,917,553
[45] Date of Patent: Apr. 17, 1990

[54] SLIDING NUT OR SCREW FOR INSERTION INTO C-BARS

[76] Inventor: Franz Muller, Eichelhaher Str. 1, 6200 Wiesbaden, Fed. Rep. of Germany

[21] Appl. No.: 334,433

[22] Filed: Apr. 7, 1989

[30] Foreign Application Priority Data

Apr. 11, 1988 [DE] Fed. Rep. of Germany ....... 3811974

[51] Int. Cl.⁴ .................... F16B 27/00; F16B 37/00; F16B 35/06
[52] U.S. Cl. .................................. 411/85; 411/104; 411/427
[58] Field of Search ............... 411/84, 85, 104, 112, 411/427, 966

[56] References Cited

U.S. PATENT DOCUMENTS

| | | | |
|---|---|---|---|
| 4,285,379 | 8/1981 | Kowalski | 411/85 |
| 4,460,299 | 7/1984 | Kowalski | 411/85 |
| 4,486,133 | 12/1984 | Pletcher | 411/84 |
| 4,575,295 | 3/1986 | Rebentisch | 411/85 |

*Primary Examiner*—Neill R. Wilson
*Attorney, Agent, or Firm*—Larson and Taylor

[57] ABSTRACT

A sliding nut (16) or sliding screw is intended for insertion into C-bars (10) having inwardly pointing marginal webs (14). In the mounted condition, the marginal webs (14) engage longitudinal grooves (22) of the nut (16) or of the screw head. The longitudinal grooves (22) are provided with projections which, during tightening of the nut and screw assembly against the C-bar, cause the marginal webs (14) to deform. At least one projection is formed by a lateral curvature or by an obtuse- or acute-angled deflection of the side wall of a longitudinal groove (22) such that it laterally bends a marginal web (14) in arcuate manner or cuts into it.

15 Claims, 2 Drawing Sheets

SLIDING NUT OR SCREW FOR INSERTION INTO C-BARS

The present invention is concerned with a sliding nut or screw intended for insertion into C-bars. The C-bars have inwardly pointing marginal webs engaging longitudinal grooves of the nut or screw-head of the screw. The grooves are provided with projections causing the marginal webs to deform whereby the nut or screw head is anchored or locked in place.

The state-of-the-art sliding nuts or screws of the aforementioned type are described, for example, by DE-PS No. 35 29 345 or DE-GM No. 85 33 059. These nuts or screws comprise sharp-edged, blade-type projections axially protruding from the bottom of the longitudinal grooves and digging themselves, during screw tightening, into the free ends of the inwardly pointing marginal webs thereby locking the sliding nut or screw in its tightened position against displacement along the bar. Similarly, another conventional sliding nut according to DE-GM No. 19 22 581 intended for use with C-bars not provided with inwardly pointing marginal webs exhibits small pointed or blade-shaped raised portions which force themselves during tightening of the screw into the material, adjacent to the longitudinal slot of the C-bar. All sliding nuts or screws of the afore-described configuration have the disadvantage in common that the areas of the cutting edges or cutting points, in whole or at least in inserts thereof, must be harder than the material of the C-bar. Moreover, strong forces are required to cause the cutting edges to dig themselves thereinto. Finally, with bars of a special type of surface, such as anodized bars, damage is done to the bar by the cutting edges or points.

It is, therefore, an object of the present invention to provide a sliding nut or screw of the afore-described type permitting a low-cost manufacture from a material softer than that of conventional designs or even softer than the material of the C-bar. This further permits an easier tightening thereof and causes less damage to the C-bar.

The afore-described problem, in the practice of the invention, is solved in that at least one projection is formed by lateral curvature or by an obtuse- or acute-angled deflection of the side wall of a longitudinal groove such that, laterally, it deforms a marginal web in arcuate manner.

The invention makes use of the discovery that lateral deformation of the free ends of the marginal webs in a direction transverse to their longitudinal direction is easier than digging points or cutting edges into the material of the C-bar by forces acting toward the point. The lateral deformation of the marginal webs can, if need be, easily re-deformed or undeformed.

The locking of the sliding nuts or screws during tightening thereof through slight lateral deformation of the marginal webs of the C-bar against displacement does not preclude, in combination with correspondingly curved or obtuse-angled longitudinal grooves, the additional provision of pointed or blade-shaped small projections in the longitudinal grooves digging themselves into the material of the C-bar. In this manner, the sliding nut or screw is locked to an even higher degree against displacement of the bar than in case of only one of the two combined deformations. If blade-shaped projections are used, a design is preferred in which the cutting edges of at least one of such sharp-edged rib-shaped projections has one directional component extending in parallel to the associated side wall of a longitudinal groove which side wall forms an acute angle with the longitudinal axis of the screw. This configuration involves the advantage of the dual keying in that, on the one hand, the oblique position of the side wall of the longitudinal groove is used and, on the other hand, the key angle of the sharp-edged, rib-shaped projection forming the blade is also used. This advantage involved with teeth laterally digging themselves into the marginal webs also can be used in the practice of the invention of the marginal webs are laterally deformed only very slightly by the teeth.

Depending on the sense of direction, sliding nuts or screws according to the invention, thanks to the lateral deformation of the marginal webs of the C-bar, also are capable to cause an improvement in the rigidity thereof.

With reference to the drawings, some examples of the invention will now be described in greater detail. In the drawings, FIG. 1 shows a cross-sectional view of a C-bar along with a sliding nut inserted thereinto;

Figure 3:
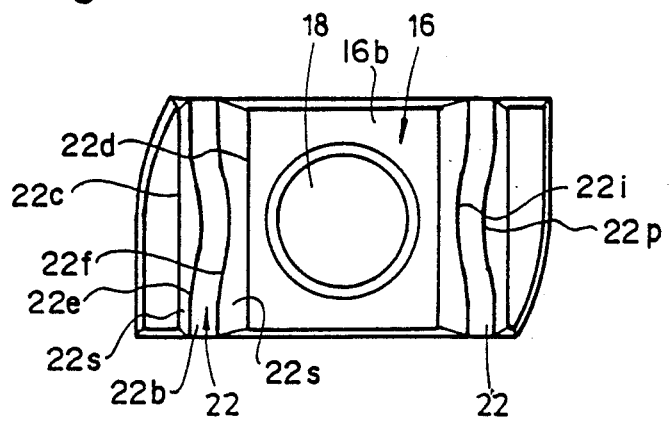
FIG. 3 shows a front view of the sliding nut according to FIGS. 1 and 2.
Figure 4:
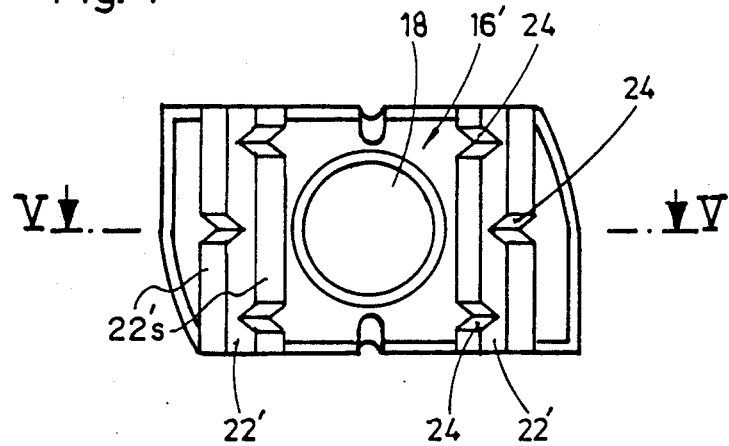
Figure 5:
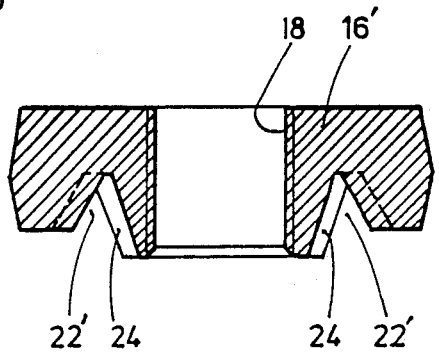

FIG. 3' shows a partial front view of an alternative sliding screw according to the present invention;

FIG. 4 is a front view of an alternative embodiment of a sliding nut according to the present invention; and FIG. 5 is a sectional view of the sliding nut of FIG. 4 along the section line V—V shown in FIG. 4.

DETAILED DESCRIPTION OF THE PREFERRED EMBODIMENTS

Figure 2:
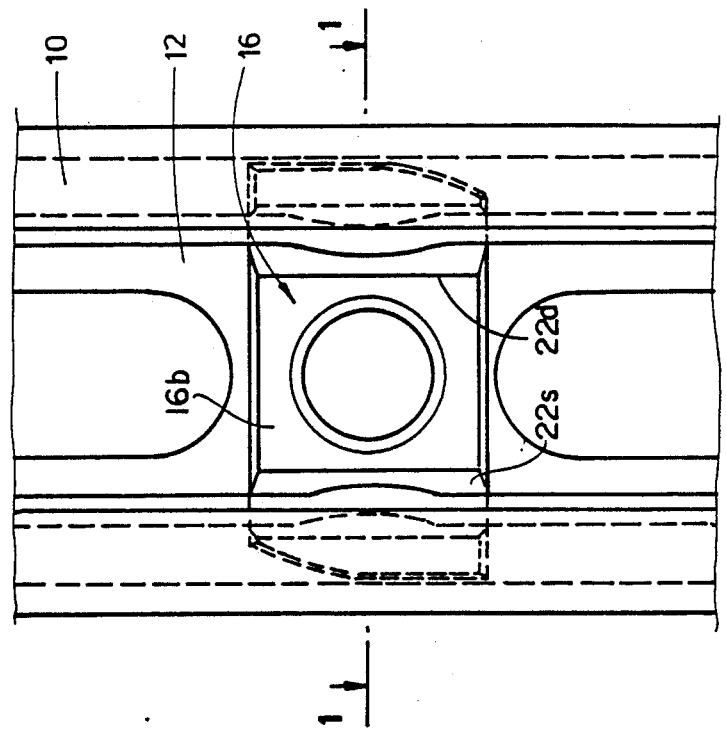
FIG. 2 is a view from the bottom of the C-bar along with the sliding nut according to FIG. 1, the section line 1—1 for FIG. 1 being indicated thereon.
Figure 1:
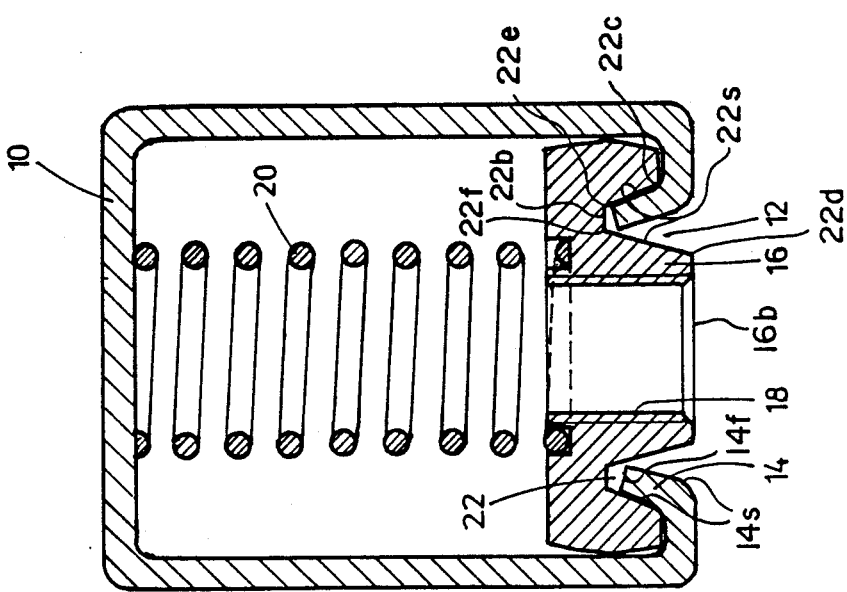

Referring to the drawing, FIGS. 1 and 2 show a conventional C-bar 10, the one-sided orifice of which extending in the longitudinal direction is designated by numeral 12. The marginal webs 14 defining the orifice 12 are bent at right or obtuse angles such that they point inwardly toward the interior of the C-bar. Either a sliding nut or screw head of a screw is receivable in orifice 12 to serve as an anchoring or locking member when the screw and nut are tightened. However, for convenience, only a nut embodiment has been depicted in most embodiments.

Seated on the marginal webs 14 is, in conventional manner, a sliding nut 16. Nut 16 comprises a threaded hole 18 by which nut 16 can be tightened against C-bar 10. This tightening occurs either by a screw or bolt (not shown) screwed therein and exerting a pressure on the opposite wall of the C-bar 10; or by a disc, screw head or another unit (not shown) which, after screwing of a bolt into the hole 18, is tightened against the horizontal area of the marginal webs 14. To preclude an inadvertent displacement of the sliding nut 16 during assembly, a helical spring 20 is loaded between nut 16 and the opposite wall of the C-bar 10. Spring 20 is fixed at one end to the sliding nut 16 while the other end is displaceable or slidable along the opposite wall of the C-bar 10.

For engaging the inwardly bent marginal webs 14 of the C-bar 10, a bottom side 16b (using the orientation depicted in FIG. 1) of the sliding nut 16 is provided with two longitudinal grooves 22 as shown in FIG. 3. Normally, in prior types of sliding nuts, the longitudinal grooves are of a rectilinear configuration as are the free ends of the marginal webs 14. However, the sliding nut 16 as shown is of a configuration such that the longitudinal grooves 22 are curved in the longitudinal direction irrespective of their oblique side walls 22c. The curvature, in the example according to FIG. 3, in both longitudinal grooves 22, is of a mirror-symmetrical configuration. Thus, in the longitudinal direction of the C-bar 10 and of the longitudinal grooves 22, the inner edges 22e and 22f thereof (the edges between the bottom 22b and the side walls 22s of the longitudinal grooves) in the center portion of the sliding nut are closest to the central longitudinal axis while on both sides of the central portion the inner edges 22d and 22c are most remote therefrom. The directional changes of the longitudinal grooves 22 are in the form of soft curves of relatively large radii forming a projection 22p and a corresponding indentation 22i.

Alternatively, as shown in FIG. 3' where a screw 36 having a screw-head 38 is partially depicted, the longitudinal groove 22" in the longitudinal direction, can be configured one time (or several times) with a large obtuse angle projection 22p' and corresponding indentation 22i', i.e., in zigzag form in the nature of one (or several) bend.

The course of the longitudinal grooves 22 extending in a manner curved or bent at obtuse angles, during screw tightening between the sliding nut 16 and the C-bar 10, results in the inwardly pointing free ends of the marginal webs 14 being curved laterally (i.e., toward the central longitudinal axis of the C-bar 10 and away therefrom, respectively), in accordance with the course of the longitudinal grooves 22. Owing to this large deformation of the marginal webs 14, which may extend throughout the length of the longitudinal grooves 22, the sliding nut is then immovably fixed to the C-bar 10.

As is best revealed by FIG. 3, the longitudinal grooves 22 of the sliding nut 16 may be configured such that both of the outer edges 22c and 22d thereof (relative to FIG. 1, the bottom edges of the longitudinal grooves 22) extend rectilinearly in parallel to the central longitudinal axis of the C-bar 10 and of the sliding nut 16. It is only the inner edges 22e and 22f in the transitory area between the side walls 22s of the longitudinal grooves 22 and the bottom 22b thereof that follow a curved course. The slope of the side walls 22s of the longitudinal grooves 22, throughout the length thereof, changes accordingly. Alternative, the longitudinal grooves 22, in general, both with their inner and with their outer edges, can be given a curved course or, an obtuse-angled zigzag course, respectively.

The sliding nut 16, as shown in the front view of FIG. 3, is not of a rectangular configuration but is rather rounded off on two diagonally opposite corners. Thus, nut 16 is so narrow (measured in the longitudinal direction of the longitudinal grooves 22) that it can be introduced through orifice 12 of the C-bar 10, and can be then turned by 90° into the position as shown in FIGS. 1 and 2.

FIGS. 4 and 5 show front and cross-sectional views, respectively, of a slightly modified sliding nut 16'. Nut 16' differs from the sliding nut 16 as shown in FIGS. 2 and 3 in that the side walls 22s' of the longitudinal grooves 22' are provided with rib-shaped projections 24 protruding inwardly in edge-shaped manner. These projections 24, during screw-tightening of the sliding nut 16' with the C-bar 10, dig themselves into the material of the marginal web 14 thereby locking the nut 16' in position. As the longitudinal grooves 22', except for projections 24, follow a linear, parallel course, a lateral curvature of the marginal webs 14 only results from a simple staggered relationship of the projections 24 on the opposite side walls 22s' of the longitudinal grooves 22'.

Of course, sharply pointed or blade-type teeth (not shown) digging themselves into the material of the marginal webs 14, can be provided in the embodiment of nut 16 shown to FIGS. 1 to 3. Such teeth could project from the bottom 22b of the curved longitudinal grooves 22 in parallel to the central longitudinal axis of the hole 18. However, it is preferred that if sharp-edged teeth and projections, respectively, are to be provided in the longitudinal grooves 22 in the embodiment of nut 16 according to FIGS. 1 and 3, then the elongated blade-shaped projections 24 according to FIGS. 4 and 5 extend throughout the height of the side walls of the longitudinal grooves 22, with the cutting edges of such projections having one directional component in parallel to the central longitudinal axis of the hole 18. In addition to the keying effect of the edge of each projection 24 as such, a keying effect arises on account of the fact that the blades follow the sloping course of the side walls 22s of the longitudinal grooves 22 throughout the height thereof. This produces the advantageous effect that in the course of the screw-tightening between sliding nut 16 and C-bar 10, an increasingly extended length of the blade-shaped ribs 24 is dug into the material of the marginal webs 14, with the section of the blade becoming effective only in the course of this process of digging themselves to a still greater depth into the material even if the section becoming first effective has already been blunted. Hence, there is no need for using inserts of hard metal for the projections 24, or of any particularly hard material for the sliding nut 16.

The fact that the blade-shaped ribs or projections formed on the side walls of the longitudinal grooves 22, as opposed to pointed projections or teeth on the bottom of the longitudinal grooves 22, are not forced against the front faces 14f of the free ends of the marginal webs 14 but rather against the side walls 14s thereof, involves an additional advantage. The additional advantage is that the marginal webs 14 are unable to evade such pressure because they are supported by the respectively opposite side walls 22s of the longitudinal grooves 22. This advantage combined with the aforementioned dual keying effect of lateral blade-shaped projections 24 even can be used in an alternative embodiment of the present invention from the so far described forms of embodiment of FIGS. 1-5. In one example of such a design exhibiting straight-lined parallel longitudinal grooves 22' as shown in FIG. 4, the projections 24 in each longitudinal groove 22' are respectively disposed on the two side walls 22s' thereof in directly opposite relationship. Although in that case, the marginal webs 14 are laterally deformed only by cuts, this form of embodiment involves the aforedescribed advantages vis-a-vis the state-of-the-art sliding nuts.

It is understood that in the configuration of the longitudinal grooves 22, there are transitional embodiments of the present invention between embodiments according to FIG. 3 leading to a rounded lateral deformation of the marginal webs 14, and embodiments according to FIG. 4 exhibiting projections 24 laterally digging themselves into the marginal webs 14.

It should be appreciated that either a sliding nut or screw head of a screw is receivable in orifice 12 to serve as an anchoring or locking member for the tightened nut and screw assembly. While a sliding nut has been primarily depicted, the corresponding configuration of a screw head would be the same insofar as engagement with the C-bar is concerned. The only difference is that in place of threaded hole 18 or 18', such a screw would instead have a solid body or head with a threaded member extending downwardly therefrom as shown by the screw-head depicted in FIG. 3'.

What is claimed is:

1. A locking member which is one of a nut and screw head of a nut and screw assembly such that said locking member is received into a C-bar having inwardly pointing marginal webs, said locking member comprising:

a bottom engaging side in which a pair of longitudinal grooves is provided with each said groove receiving in an open top thereof a respective web of the C-bar, each said groove defining a bottom wall and opposed side walls which said side walls are inclined inwardly toward one another from said open top to said bottom wall, and each said groove also having a projection from one of said side walls of each said groove and a corresponding indentation on the other said side wall of each said groove laterally opposite said projection, such that as the nut and screw assembly is tightened said projection causes the marginal web adjacent thereto to laterally bend in an arcuate manner towards said indentation.

2. A locking member as claimed in claim 1 wherein said projection and said indentation longitudinally extend over one-half of a length of the respective said groove.

3. A locking member as claimed in claim 1 wherein a second projection and a corresponding second indentation are provided on each said groove.

4. A locking member as claimed in claim 1 wherein each said groove includes inner edges defined at intersections of said side walls and said bottom wall, and wherein said inner edges follow a contour of an associated one of said projection and said indentation.

5. A locking member as claimed in claim 1 wherein each said groove includes inner edges defined at intersections of said side walls and said bottom wall and outer edges defined at intersections of said side walls and said open top, and wherein said outer edges are straight and parallel while said inner edges follow a contour of an associated one of said projection and said indentation.

6. A locking member as claimed in claim 1 wherein the side wall of each said groove includes a pointed cutting edge.

7. A locking member as claimed in claim 1 and further including a compression spring attached to a top non-engaging side opposite to said engaging face such that said compression spring engages the C-bar opposite the opening thereof to urge said engaging side into contact with the marginal webs of the C-bar.

8. A locking member as claimed in claim 1 wherein each said projection includes a pointed cutting edge whereby as an end of said marginal web is forced in as associated said groove said pointed cutting edge cuts into an adjacent lateral side of said marginal web.

9. A locking member as claimed in claim 1 wherein said projection defines an apex at which said projection projects a maximum distance into said groove and a beginning on each side of said apex at which said projection begins to project into said groove, and wherein the angle formed from said apex to each beginning is obtuse.

10. A locking member as claimed in claim 1 wherein said projection is a smooth curve.

11. A locking member which is one of a nut and screw head of a nut and screw assembly such that said locking member is received into a C-bar having inwardly pointing marginal webs, said locking member comprising:

a bottom engaging side in which a pair of longitudinal grooves are provided with each said groove receiving an open top thereof in a respective web of the C-bar, each said groove defining a bottom wall and opposed side walls which said side walls are inclined inwardly toward one another from said open top to said bottom wall; and a projection from each of said side walls of each said groove, each said projection of a said groove being staggered with respect to the other said projection of said groove and having a cutting edge which projects into said respective groove and is parallel to the associated said side wall as said cutting edge proceeds from said open top to said bottom wall such that as the nut and screw assembly is tightened and an end of said marginal web is forced in an associated said groove, said cutting edges cut into an adjacent lateral side of said marginal web and because of the staggering of said cutting edges and the associated inclined side wall opposite thereto cause the marginal web adjacent to said cutting edges to laterally bend in an arcuate manner.

12. A locking member as claimed in claim 11 wherein a second projection is provided on one of said side walls of each said groove.

13. A locking member as claimed in claim 11 wherein each said groove includes inner edges defined at intersections of said side walls and said bottom wall and outer edges defined at intersections of said side walls with said open top, and wherein both said inner edges and said outer edges follow a contour of an associated said projection.

14. A locking member as claimed in claim 11 and further including a compression spring attached to a top non-engaging side opposite to said engaging face such that said compression spring engages the C-bar opposite the opening thereof to urge said engaging side into contact with the marginal webs of the C-bar.

15. A locking member as claimed in claim 11 wherein the angle formed between said inclined side walls of a groove is less than 90°.

* * * * *